US008393594B2

(12) United States Patent
Morozumi et al.

(10) Patent No.: US 8,393,594 B2
(45) Date of Patent: Mar. 12, 2013

(54) DRIVE MECHANISM, ACTUATOR, AND VALVE

(75) Inventors: Akio Morozumi, Matsumoto (JP); Manabu Fukuda, Matsumoto (JP)

(73) Assignee: T&D Corporation, Matsumoto-Shi, Nagano (JP)

( * ) Notice: Subject to any disclaimer, the term of this patent is extended or adjusted under 35 U.S.C. 154(b) by 239 days.

(21) Appl. No.: 12/741,250

(22) PCT Filed: Nov. 5, 2008

(86) PCT No.: PCT/JP2008/070120
§ 371 (c)(1),
(2), (4) Date: Jun. 8, 2010

(87) PCT Pub. No.: WO2009/060860
PCT Pub. Date: May 14, 2009

(65) Prior Publication Data
US 2010/0264339 A1    Oct. 21, 2010

(30) Foreign Application Priority Data
Nov. 5, 2007  (JP) ................................. 2007-287158

(51) Int. Cl.
*F16K 31/08*    (2006.01)
(52) U.S. Cl. .............................. 251/65; 251/249; 74/436
(58) Field of Classification Search .................. 251/249, 251/250.5, 65, 129; 74/436
See application file for complete search history.

(56) References Cited

U.S. PATENT DOCUMENTS

| 2,605,647 A | * | 8/1952 | Duvoisin ........................ 74/436 |
| 2,625,833 A | * | 1/1953 | Johnson ........................... 74/436 |
| 3,476,355 A | * | 11/1969 | Sherwood ........................ 251/65 |
| 3,855,873 A | * | 12/1974 | Fletcher et al. ................. 74/436 |

(Continued)

FOREIGN PATENT DOCUMENTS

| DE | 337766 C1 | 6/1921 |
| GB | 2101810 A | * 1/1983 |

(Continued)

OTHER PUBLICATIONS

Notification of Transmittal of Translation of the International Preliminary Report on Patentability (IPRP) (Forms PCT/IB/338 and PCT/IB/373) and Written Opinion of the International Searching Authority and International Preliminary Report on Patentability (Form PCT/ISA/237) issued in corresponding Japanese PCT Application No. PCT/JP2008/070120 dated Jul. 8, 2010.

(Continued)

*Primary Examiner* — Eric Keasel
*Assistant Examiner* — Umashankar Venkatesan
(74) *Attorney, Agent, or Firm* — Buchanan Ingersoll & Rooney PC (57) ABSTRACT

A driving mechanism (100) includes a first rotor (10) that rotates around a first shaft L1 and a second rotor (20) that rotates around a second shaft L2 that is provided in parallel with the first shaft L1. The first rotor (10) includes a guide (13) that extends in a circular arc around the first shaft L1 and a drive pin (14) that is provided outside the guide (13) relative to the first shaft L1. The second rotor (20) includes a first member (40) with a plurality of leads (41) that extend in the radial direction from the second shaft L2 and a second member (50) that is provided between the first rotor (10) and the first member (40), that moves together with the first member (40), and that includes a plurality of first surfaces (51) with substantially the same curvature as a circular arc-shaped outer surface (13b) of the guide (13).

5 Claims, 5 Drawing Sheets

U.S. PATENT DOCUMENTS

| | | | | |
|---|---|---|---|---|
| 4,765,196 | A | * | 8/1988 | Russ .............................. 74/436 |
| 4,989,641 | A | * | 2/1991 | Jones et al. .............. 137/625.11 |
| 6,791,289 | B1 | * | 9/2004 | Long et al. .................... 318/444 |
| 7,057,369 | B2 | * | 6/2006 | Hoffmann ..................... 318/647 |
| 7,597,123 | B2 | * | 10/2009 | Wang ............................ 141/114 |

FOREIGN PATENT DOCUMENTS

| | | |
|---|---|---|
| JP | 51-050165 | 4/1976 |
| JP | 58-022552 | 2/1983 |
| JP | 5-280659 A | 10/1993 |
| JP | 7-317929 A | 12/1995 |
| JP | 9-210172 A | 8/1997 |

OTHER PUBLICATIONS

International Search Report (PCT/ISA/210) for PCT/JP2008/070120 dated Feb. 10, 2009.

* cited by examiner

DRIVE MECHANISM, ACTUATOR, AND VALVE

TECHNICAL FIELD

The present invention relates to an actuator with a driving mechanism for rotating an operation transmitting structure which is capable of being directly or indirectly connected to a operating target so that the actuator can be favorably used to drive the operating target, which may be a valve.

BACKGROUND ART

Japanese Laid-Open Patent Publication No. H05-280659 (hereinafter, "Document 1") discloses a diaphragm-type automatic on-off valve equipped with a pilot valve. This automatic on-off valve includes a pilot valve seat provided on a control flow channel, a pilot valve that moves toward and away from the pilot valve seat to open and close the control flow channel, a magnet ("control magnet") that is driven by a motor, and a magnet that is coupled to the pilot valve.

This diaphragm-type automatic on-off valve is an automatic on-off valve that is controlled by a permanent magnet actuator and has a pilot valve controlled using a permanent magnet actuator. The permanent magnet actuator is composed of a motor that is capable of both forward and reverse rotation and a control magnet driving apparatus that is driven by the motor. The control magnet driving apparatus is composed of a drive shaft and a control magnet holder that holds two magnets that have a south pole and a north pole. With this automatic on-off valve, the magnet that is driven (i.e., rotated or moved reciprocally) by the motor attracts or repels the magnet that is coupled to the pilot valve, thereby causing the pilot valve to move toward or away from the pilot valve seat.

Japanese Laid-Open Patent Publication No. H07-317929 (hereinafter "Document 2") discloses a three-way electrical valve with a Geneva drive. In this three-way electrical valve, a valving element with a T-shaped through-hole is disposed inside a valve element that has three openings. A valve shaft of the valve element is rotated by a driving motor connected via the Geneva drive ("intermittent driving force transmitting means"). The Geneva drive (intermittent driving force transmitting means) used in this three-way electrical valve has a driver and a follower and intermittently transmits a driving force from the driver, which is driven at a constant speed, to the follower. With the Geneva drive disclosed in Patent Document 2, the follower intermittently rotates in steps of 90° every time the driver rotates by 360° (i.e., one revolution).

DISCLOSURE OF THE INVENTION

A first aspect of the present invention is a driving mechanism that includes a first rotor and a second rotor. The first rotor (first driver) rotates around a first shaft and includes a guide that extends in a circular arc around the first shaft and a drive pin that is located outside the guide relative to the first shaft. The second rotor (second driver) rotates around a second shaft that is arranged in parallel with the first shaft. The second shaft is disposed outside the guide relative to the first shaft and closer to the drive pin (i.e., inside the drive pin) relative to the first shaft. That is, the second shaft is disposed so that when the first rotor rotates, the guide passes inside the second shaft and the drive pin passes outside the second shaft.

The second rotor includes a first member and a second member. The first member includes a plurality of leads that extend in the radial direction from the second shaft, with the drive pin entering one of the leads when the first rotor rotates. The second member is disposed between the first rotor and the first member and moves together with the first member. The second member includes a plurality of first surfaces that have substantially the same curvature as a circular arc-shaped outer surface of the guide, wherein as the first rotor rotates, one out of the first surfaces comes into contact with and becomes separated from the outer surface of the guide. The plurality of leads are disposed (formed) so as to be symmetrical to one another about the second shaft, the plurality of first surfaces are disposed (formed) so as to be symmetrical to one another about the second shaft, and the plurality of leads and the plurality of first surfaces alternately appear around the second shaft. That is, the plurality of leads and the plurality of first surfaces are disposed so that each lead is symmetrical with other leads and each first surface is symmetrical with other first surfaces about the second shaft and so that the leads and the first surfaces alternate around the second shaft.

With this driving mechanism, when the first rotor rotates and the drive pin enters one of the plurality of leads, contact between one of the plurality of first surfaces and the outer surface of the guide ends (is released) and the second rotor rotates around the second shaft. When the first rotor further rotates the drive pin moves out of the one of the plurality of leads, the next first surface out of the plurality of first surfaces (i.e., the next first surface after the first surface that was previously in contact with the outer surface of the guide) will contact the outer surface of the guide.

With this driving mechanism, the rotational shaft of the second rotor (i.e., the "second shaft") is disposed, relative to the rotational shaft of the first rotor (i.e., the "first shaft"), outside the guide and inside the drive pin. This means that when the first rotor rotates and the drive pin enters one of the plurality of leads, contact between one of the first surfaces and the outer surface of the guide ends and the second rotor rotates around the second shaft in the same direction as the direction of rotation of the first rotor. When the first rotor further rotates and the drive pin exits the one of the plurality of leads, the next first surface out of the plurality of first surfaces contacts and be guided by the outer surface of the guide and rotation of the second rotor stops. Accordingly, by typically providing two leads at a pitch of 180°, the second rotor rotates intermittently in steps of 180°.

To cause the second rotor to rotate smoothly using the drive pin, the plurality of leads should preferably be long. On the other hand, to stop excessive rotation of the second rotor at an appropriate position, the radius of the circular arc-shaped guide of the first rotor should preferably be large. In this driving mechanism, the second rotor includes separate members, that is, the first member that includes the leads into which the drive pin enters and the second member with first surfaces that are guided by the guide, with the two members rotating as a layered single body. Accordingly, it is possible to dispose the rotational shaft of the second rotor (i.e., the second shaft), relative to the rotational shaft of the first rotor (i.e., the first shaft), outside the guide and inside the drive pin.

When the second rotor is intermittently rotated in steps of 180°, the second rotor includes two leads that are provided at a pitch of 180° (i.e., with rotational symmetry of order two).

The first member should preferably include a plurality of stopper pins that contact a circular arc-shaped inner surface of the guide. Each pin out of the plurality of stopper pins should preferably be disposed so as to pass a (gap) part where the guide is not provided when the second rotor rotates.

The first surfaces of the second member of the second rotor hold the position (posture) of the second rotor, and in particular a posture where the drive pin enters a lead. To do so, the first surfaces should preferably contact the guide until immediately before such posture is achieved. On the other hand, the second rotor rotates in the same direction as the direction of rotation of the first rotor. This means that if the first surfaces of the second member extend in the circumferential direction, the second member will interfere with the guide, so that when the second rotor rotates, there is the risk of such rotation being obstructed. By providing a plurality of stopper pins that contact a circular arc-shaped inner surface of the guide, it is possible to interpose the guide between a first surface of the second member and a stopper pin of the first member and further stabilize the posture of the second rotor. Also, since the stopper pins are disposed so as to pass a (gap) part where the guide is not provided when the second rotor rotates, the stopper pins will not obstruct the rotation when the second rotor rotates. Accordingly, in particular to maintain the posture when the drive pin enters a lead, the posture of the second rotor immediately prior to such point is stably maintained due to a stopper pin contacting the guide.

Another aspect of the present invention is an actuator that includes the driving mechanism described above, a motor for rotating the first rotor, and an operation transmitting structure (operating transmitter) that rotates in an interlocked manner with the second rotor and is capable of being directly or indirectly connected to an operating target (driven object). A typical example of this actuator is a so-called "permanent magnet actuator". A permanent magnet actuator includes a first permanent magnet and a second permanent magnet that face one another in a first direction, where the operation transmitting structure includes the first permanent magnet. According to this actuator, the operation transmitting structure intermittently rotates in steps of 180°, for example. By such rotation, the first permanent magnet rotates so that the north pole and the south pole are inverted. By using this construction, magnetic attraction (a pulling force) and repulsion (a repelling force) will alternately act between the first permanent magnet and the second permanent magnet, so that the second permanent magnet can be reciprocally driven in the first direction.

Another aspect of the present invention is a valve including the actuator described above and the operating target (driven object) that is directly or indirectly connected to the operation transmitting structure (the first permanent magnet) and is driven by the actuator. A typical operating target is a valve element (valve main body).

In this valve, since the operation transmitting structure intermittently rotates by 180° for example, the first permanent magnet rotates so as to invert the north pole and the south pole. Accordingly, magnetic attraction (a pulling force) and repulsion (a repelling force) alternately act between the first permanent magnet and the second permanent magnet, so that the second permanent magnet moves (be driven) in the first direction.

Therefore, in this valve, an operation such as opening and closing the valve can be achieved by rotating the first rotor in one direction using a DC motor or the like. Accordingly, the valve can open and close using a comparatively simple construction and comparatively little power. The present valve can use in place of an electromagnetic valve or the like. Also, to intermittently rotate the operation transmitting structure (the first permanent magnet), it is typically unnecessary to accurately control the positions at which a DC motor starts and stops. Accordingly, complex or precise control of a DC motor is unnecessary, and it is sufficient to turn a motor on and off on detecting that the poles of the first permanent magnet have been interchanged. The valve may alternatively include the actuator described above and a valve element whose flow channel is opened and closed owing to the movement of the second permanent magnet.

DETAIL DESCRIPTION

Figure 1:
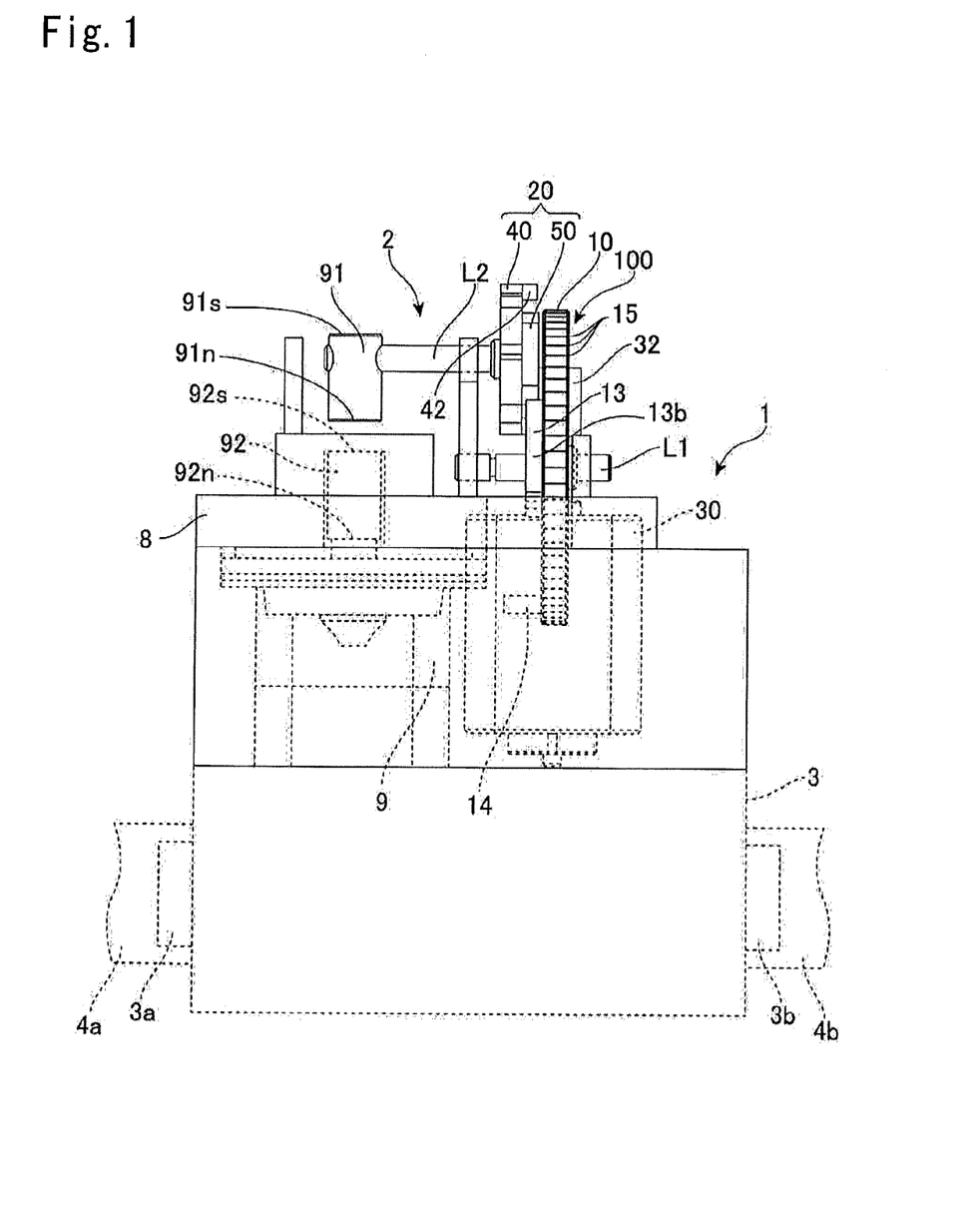
FIG. 1 is a see-through view showing a valve from the side.
Figure 2:
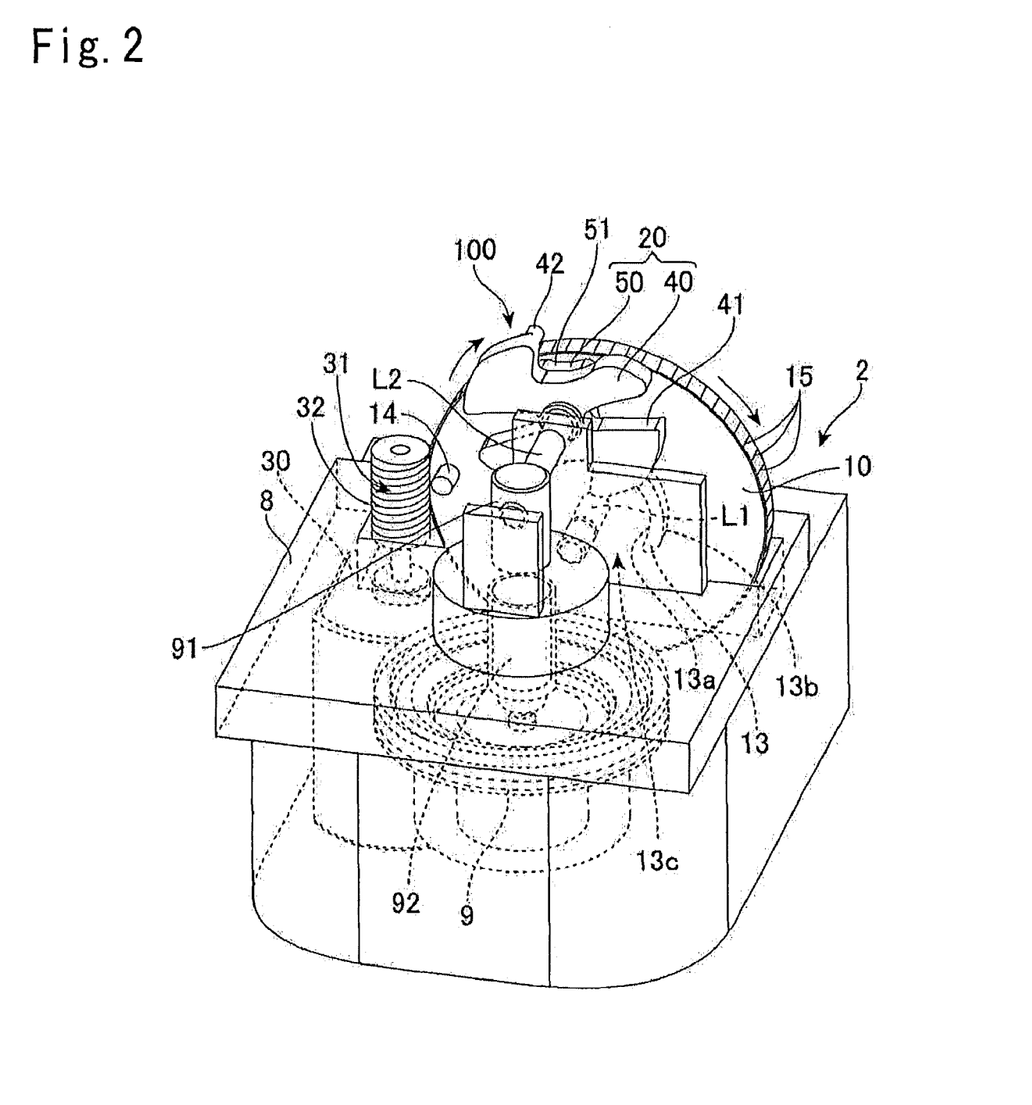
FIG. 2 is a perspective view of an actuator of the valve in FIG. 1.
Figure 3:
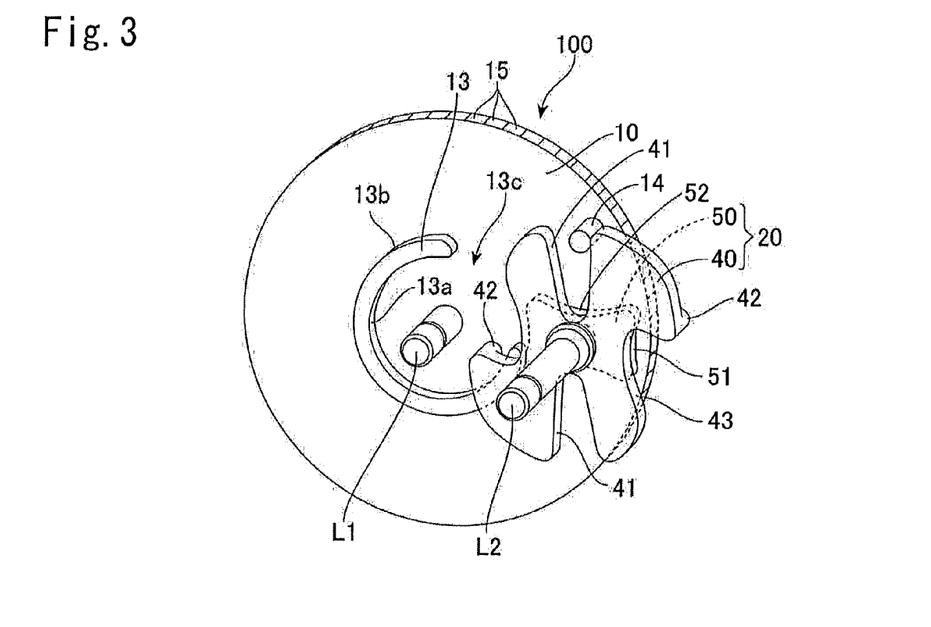
FIG. 3 is a perspective view showing part of a driving mechanism of the actuator in FIG. 2.

An embodiment of the present invention will now be described with reference to the attached drawings. FIG. 1 is a see-through view showing a valve from the side. FIG. 2 is a perspective view of an actuator of the valve. FIG. 3 is a perspective view of part of a driving mechanism of the actuator. Note that in FIG. 3, a motor and gears that are connected to the rotational shaft of the motor have been omitted.

This valve (electrical control valve) 1 is used to intermittently supply a liquid such as water from one place to another (i.e., to allow or stop a liquid from flowing), and includes an actuator 2, a valve element 3 (valve element sometime being referred to as the "small valve", "pilot valve", "operating target", or "driven object"), an actuator body (or simply "body") 8, and a diaphragm 9. The valve element (main body) 3 has two ports numbered 3a and 3b. Liquid is supplied from a first tube 4a connected to the first port 3a and is discharged via a second tube 4b connected to the second port 3b. As one example, the first port 3a is capable of being connected via the first tube 4a to a domestic water supply.

The diaphragm 9 operated by the actuator 2 may be directly moved up and down by a permanent magnet actuator as shown in the present example, or alternatively may use a pilot valve, as described in Document 1. When a pilot valve is used, as described in Document 1, a flow channel (or "control flow channel") that passes through the diaphragm 9 is opened and closed by a second permanent magnet 92 described below, with the resulting pressure difference on both sides of the diaphragm 9 causing the diaphragm 9 to move and open or close the valve. This type of valve may operate as a pilot valve where another valve is opened and closed using a fluid.

The actuator 2 includes a first permanent magnet 91 and the second permanent magnet 92 that face one another in a first direction, for example, the up-down direction, and a driving mechanism 100 that rotationally drives the first permanent magnet (in this embodiment the first permanent magnet is the operation transmitting structure) 91. The valve element 3 is operatively connected to the second permanent magnet 92 via the diaphragm 9. The second permanent magnet 92 moves up and down inside the body 8 that is molded out of resin. In the example shown in FIG. 1, a bar-shaped second permanent magnet 92 that moves up and down inside the body 8 is set so that the south pole 92s is at the top and the north pole 92n is at the bottom. Accordingly, when the bar-shaped first permanent magnet 91 rotates about a second shaft L2 so as to become oriented with the south pole 91s of the first permanent magnet 91 at the top and the north pole 91n at the bottom, due to the magnetic attraction between the permanent magnets 91 and 92, the second permanent magnet 92 becomes positioned at the top (the state shown in FIG. 1). Also, when the bar-shaped first permanent magnet 91 has rotated by a half-revolution (180°) so as to become oriented with the south pole 91s at the bottom and the north pole 91n at the top, due to the magnetic repulsion between the permanent magnets 91 and 92, the second permanent magnet 92 becomes positioned at the bottom. As the force that moves the second permanent magnet 92 up and down, it is also possible to use other forces aside from magnetic forces, such as a spring or a diaphragm.

Components of the valve 1 driven by the second permanent magnet 92 including the second permanent magnet 92 are sealed inside the body 8. However, by inverting the first permanent magnet 91 using the driving mechanism 100 so as to interchange the poles, it is possible to move the second permanent magnet 92 up and down inside the body 8 and thereby drive the diaphragm 9 connected to the second permanent magnet 92 up and down. This means that it is possible to indirectly drive the diaphragm 9 included in the valve 1 via magnetic forces without directly driving the diaphragm 9 in a mechanical manner. Accordingly even if the diaphragm 9 breaks, no water will leak out of the valve 1. Similarly, no water will flow out of the valve 1 when the diaphragm 9 is a part of pilot valve.

The driving mechanism (Geneva drive) 100 includes a first rotor (or "first driver") 10 that rotates around a first shaft L1, a second rotor (or "second driver") 20 that rotates around a second shaft L2 disposed in parallel with the first shaft L1, and a motor 30 that rotates the first rotor 10. The first rotor (rotation body) 10 is a disc-shaped gear and includes a guide (or "stopper") 13 that extends in an arc around the first shaft L1 and a drive pin 14 that is provided outside the guide 13 relative to the first shaft L1. Cam grooves (or "gear grooves") 15 are provided around the circumference of the first rotor 10. A cam barrel (or "worm gear") 32 that has a cam groove (or "spiral groove") 31 provided on an outer circumference thereof is provided on the shaft of the motor 30. When the motor 30 rotates, the cam groove 31 of the cam barrel 32 engages the cam grooves 15 of the first rotor 10 so that the first rotor 10 rotates to the right (clockwise). Note that in the present specification, this refers to clockwise when looking from the first permanent magnet 91 that is rotationally driven by the second rotor 20. When the first rotor 10 rotates clockwise, the guide 13 rotates around the first shaft L1 and the drive pin 14 rotates along the circumference of the first rotor 10.

The driving mechanism 100 will operate in the same way regardless of whether the first rotor 10 rotates clockwise or anti-clockwise. To simplify the explanation, in this example, the first rotor 10 rotates clockwise. The method of driving the first rotor 10 is not limited to combining the first rotor 10 with a motor that uses a worm gear, as in the present embodiment. The driving source is not limited to a motor, but a DC motor is one of the simplest mechanisms and a typical driving source with suitable characteristics for the driving mechanism 100. Also, although the first rotor 10 in the form of a disc-shaped gear is an example of a typical first rotor, the first rotor 10 may rotate with the first shaft L1 as a drive shaft. In such case, the first rotor 10 does not need to be disc-shaped. For example, the first rotor 10 may have a shape where an arm-shaped member extends in the radial direction from the guide 13 and the drive pin 14 is provided on the end of the arm-shaped member.

The second shaft L2 is located outside the guide 13 relative to the first shaft L1 and closer to the first shaft L1 than the drive pin 14 (i.e., inside the drive pin 14). That is, the second shaft L2 is disposed so that when the first rotor 10 rotates, the guide 13 passes inside the second shaft L2 and the drive pin 14 passes outside the second shaft L2.

The first permanent magnet 91 is connected to the second shaft L2. The second rotor (second rotation body) 20 includes a first member (or "Geneva wheel") 40, which has two lead grooves (or "leads") 41 that extend in the radial direction from the second shaft L2 and two stopper pins 42 that contact a circular arc-shaped inner surface 13a of the guide 13, and a second member (or "stopper") 50, which has two guide surfaces (or "first surfaces") 51 that have substantially the same curvature as a circular arc-shaped outer surface 13b of the guide 13 and contact the circular arc-shaped outer surface 13b of the guide 13.

The lead grooves 41 of the first member 40 are respectively formed by partially cutting away the first member 40, for example, so that when the first rotor 10 rotates and reaches a predetermined angle, the drive pin 14 that protrudes from the first rotor 10 toward the second rotor 20 will enter one of the lead grooves 41. The lead grooves 41 may be concave. The lead grooves 41 are provided at a pitch of 180° so that the lead grooves are symmetrical about the second shaft L2 (i.e., have rotational symmetry of order two).

The stopper pins 42 that protrude from the first member 40 toward the first rotor 10 are respectively disposed so that when the second rotor 20 rotates (clockwise rotation when looking from above (i.e., the first member-side)), the stopper pins 42 will pass a (gap) part 13c where the guide 13 that protrudes from the first rotor 10 toward the second rotor 20 is not provided. Accordingly, when the second rotor 20 is driven by the drive pin 14, the second rotor 20 rotates without interfering with the first rotor 10. The stopper pins 42 are provided with a 180° pitch so that the stopper pins are symmetrical about the second shaft L2 (i.e., have rotational symmetry of order two). In addition, the stopper pins 42 are provided at positions that are shifted by approximately 90° from the lead grooves 41. This means that the two lead grooves 41 and the two stopper pins 42 are alternately disposed about the second shaft L2 and effectively operate one after the other.

The second member 50 is provided between the first rotor 10 and the first member 40, that is, being provided below the first rotor 10, and moves together with the first member 40. On the circumferential surface of the second member 50, guide surfaces (first surfaces) 51 that contact the guide 13 are provided at a 180° pitch so that the guide surfaces are symmetrical about the second shaft L2 (i.e., have rotational symmetry of order two). The guide surfaces 51 are provided at positions that are shifted by approximately 90° from the lead grooves 41. This means that the two lead grooves 41 and the two guide surfaces 51 are alternately disposed about the second shaft L2 and effectively operate one after the other. The second member 50 is formed with a size that can be hidden below the first member 40. That is, out of the circumferential surface of the second member 50, surfaces 52 between the guide surfaces 51 are curved to prevent interference with the lead grooves 41. Also, out of the circumferential surface of the first member 40, surfaces 43 between the lead grooves 41 are curved to prevent interference with the guide surfaces 51.

With the actuator 2, when the first rotor 10 has rotated and the drive pin 14 has entered one of the two lead grooves 41, the contact between one of the guide surfaces 51 and the outer surface 13b of the guide 13 ends (is released) and the second rotor 20 will rotate around the second shaft L2 in the same direction as the first rotor 10 (to the right (i.e., clockwise) when looking from above in the drawing). Also, when the drive pin 14 moves out of contact with one of the two lead grooves 41, the next guide surface 51 out of the two guide surfaces 51 will contact the outer surface 13b of the guide 13 and stop the rotation of the second rotor 20.

With the Geneva drive disclosed in Document 2, when the driver that corresponds to the first rotor rotates, the follower that corresponds to the second rotor will rotate intermittently in steps of 90° in the opposite direction to the direction of rotation of the first rotor (driver). That is, when the drive pin of the driver enters a groove of the follower, the follower rotates by 90°, and when the drive pin of the driver makes contact with the circumferential surface (outer surface) between the guides of the follower, rotation of the follower is stopped.

With the Geneva drive disclosed in Document 2, the rotational shaft of the follower (which corresponds to the second shaft) is positioned outside (and on the opposite side to) the drive pin relative to the rotational shaft of the driver (which corresponds to the first shaft), and the angle that joins the position where the drive pin enters the guide of the follower, the rotational shaft of the follower, and the position where the drive pin exits the guide of the follower is approximately 90°. This means that the follower intermittently rotates in steps of 90°.

To cause the follower to rotate intermittently in steps of 180°, it is necessary to set the angle that joins the position where the drive pin enters the guide of the follower, the rotational shaft of the follower, and a position where the drive pin exits the guide of the follower at approximately 180°. With the Geneva drive disclosed in Document 2, the rotational shaft of the follower is positioned outside the drive pin relative to the rotational shaft of the driver. That is, the drive pin is positioned so as to pass between the shaft of the driver and the shaft of the follower. This means that it is not possible to rotate the follower intermittently in steps of 180°. Accordingly, it is not possible to intermittently rotate the driven object in steps of 180°.

On the other hand, with the driving mechanism 100, the second shaft L2 is positioned outside the guide 13 relative to the first shaft L1 and inside the drive pin 14 relative to the first shaft L1. That is, the drive pin 14 passes outside the second shaft L2. This means that using the first rotor 10, it is possible to intermittently rotate the second rotor 20 in steps of 180°, for example, in the same direction as the direction of rotation of the first rotor 10.

Next, the operation of the driving mechanism 100 will be described in more detail. FIGS. 4 to 8 show part of the driving mechanism 100 of the actuator 2.

Figure 4:
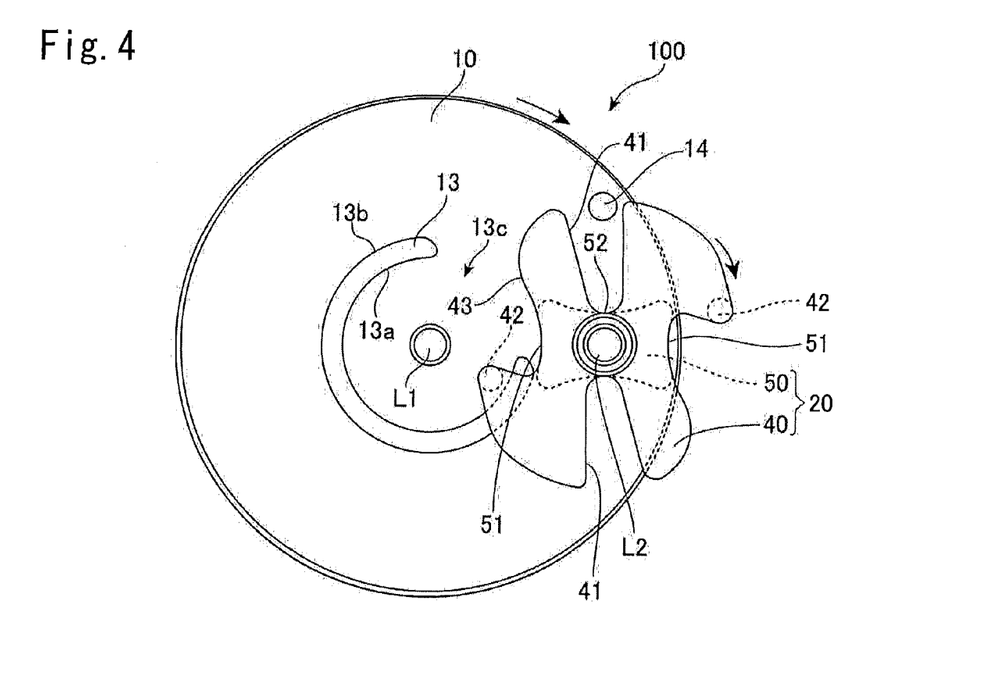
FIG. 4 is a plan view showing part of the driving mechanism in FIG. 2 in a state where a drive pin of a first rotor has begun entering a lead of a first member of a second rotor and contact between a first surface of a second member of the second rotor and an outer surface of a guide of the first rotor is about to end.

As shown in FIG. 4, when the drive pin 14 of the first rotor 10 ("first driver") 10 has begun entering one of the lead grooves 41 of the first member 40 of the second rotor ("second driver") 20, one of the guide surfaces 51 of the second member 50 of the second rotor 20 starts to become released from (i.e., become separated from) the outer surface 13b of the guide 13 of the first rotor 10. One of the stopper pins 42 of the first member 40 of the second rotor 20 also starts to become released from (i.e., become separated from) the inner surface 13a of the guide 13 of the first rotor 10. That is, until the drive pin 14 of the first rotor 10 enters one of the lead grooves 41 of the first member 40 of the second rotor 20, the guide 13 is interposed between one of the guide surfaces 51 of the second member 50 and one of the stopper pins 42 of the first member 40. This means that the drive pin 14 of the first rotor 10 will smoothly enter one of the lead grooves 41 of the first member 40 of the second rotor 20 without unintended forward or backward rotation of the second rotor 20.

Figure 5:
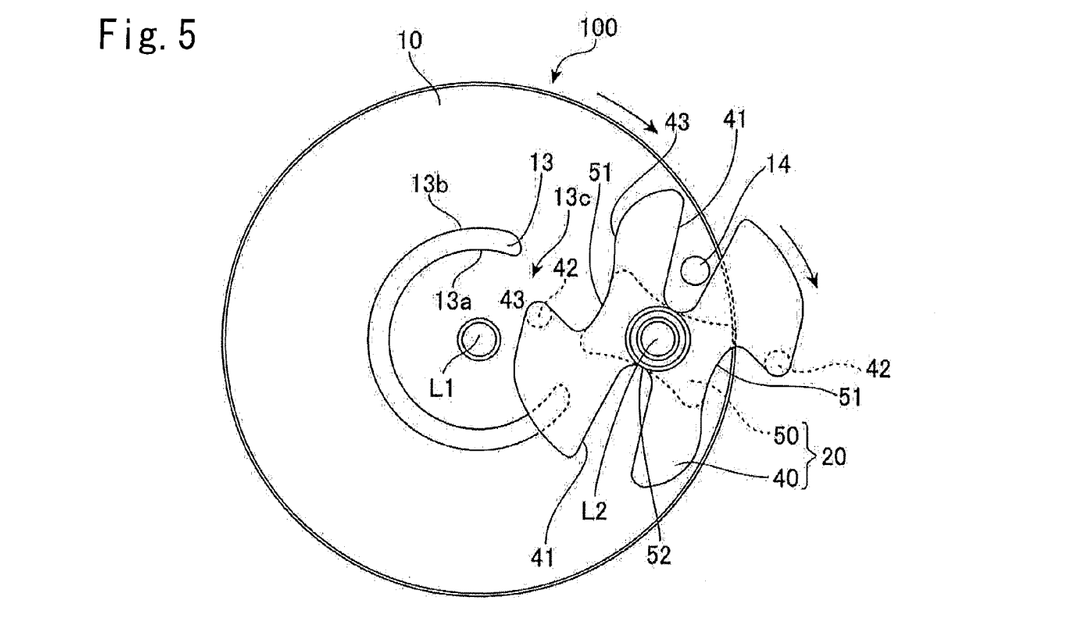
FIG. 5 is a plan view showing part of the driving mechanism in FIG. 2 in a state where the first member of the second rotor is driven by the drive pin of the first rotor and the second rotor is rotating.
Figure 6:
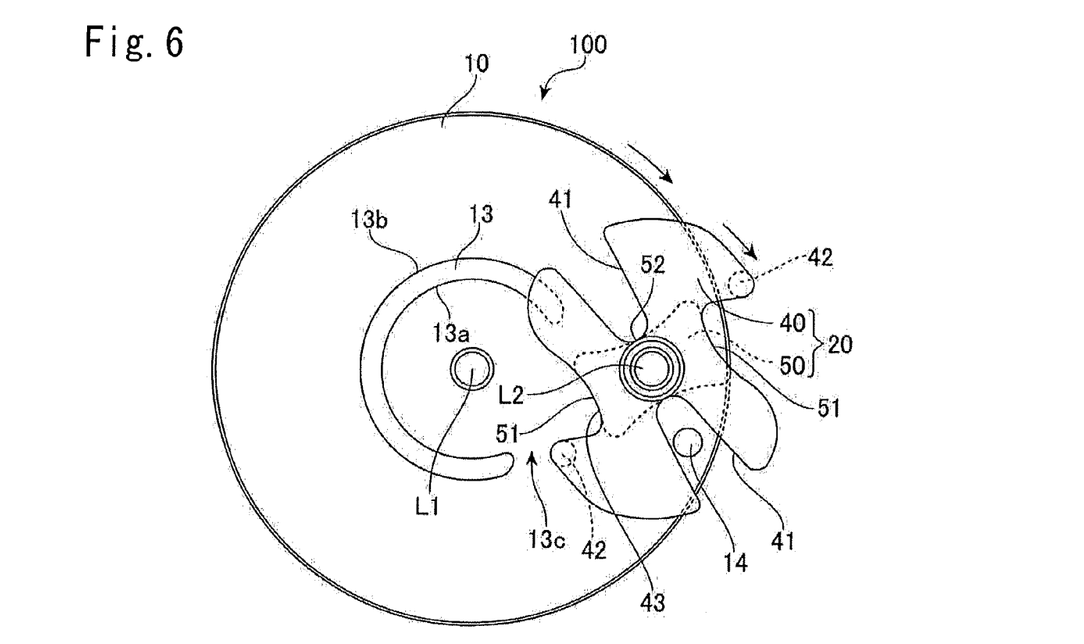
FIG. 6 is a plan view showing part of the driving mechanism in FIG. 2 in a state where the first member of the second rotor is driven by the drive pin of the first rotor and the second rotor has rotated further.

When the rotation of the first rotor 10 proceeds further and, as shown in FIGS. 5 and 6, the drive pin 14 of the first rotor 10 enters one of the lead grooves 41 of the first member 40 of the second rotor 20, the first member 40 of the second rotor 20 is pressed (driven, forced) by the drive pin 14 of the first rotor 10 so that the second rotor 20 rotates in the same direction as the first rotor 10. At this time, one of the stopper pins 42 of the first member 40 of the second rotor 20 passes the (gap) part 13c where the guide 13 is not provided.

Figure 7:
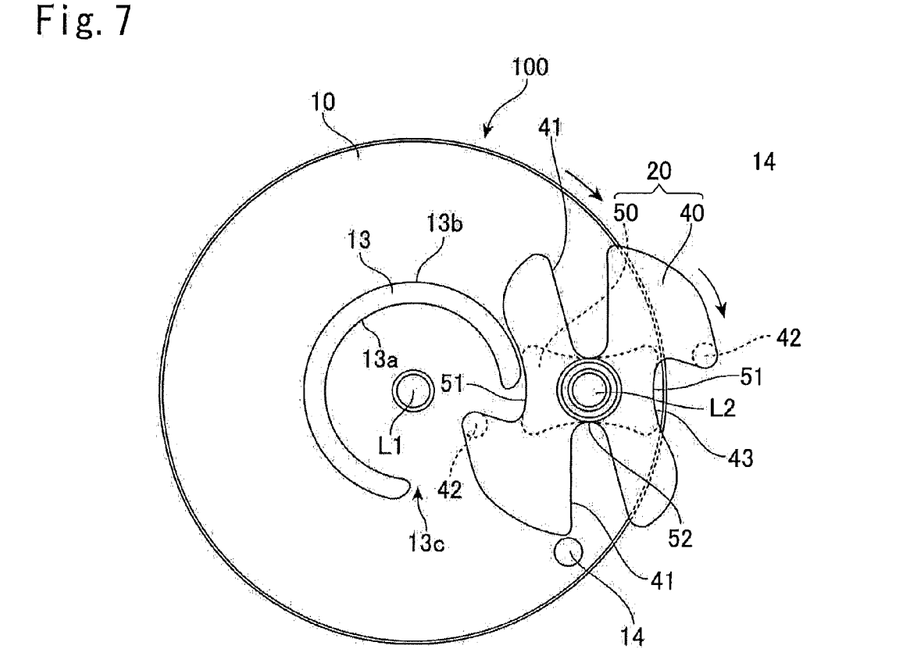
FIG. 7 is a plan view showing part of the driving mechanism in FIG. 2 in a state where the drive pin of the first rotor has begun moving out of the lead of the first member of the second rotor.

When the rotation of the first rotor 10 proceeds still further and, as shown in FIG. 7, the drive pin 14 of the first rotor 10 starts to exit the one of the lead grooves 41 of the first member 40 of the second rotor 20, one of the guide surfaces 51 of the second member 50 of the second rotor 20 comes into contact with the guide 13 of the first rotor 10 and rotation of the second rotor 20 stops. One of the stopper pins 42 of the first member 40 of the second rotor 20 then comes into contact with the inner surface 13a of the guide 13 of the first rotor 10.

Figure 8:
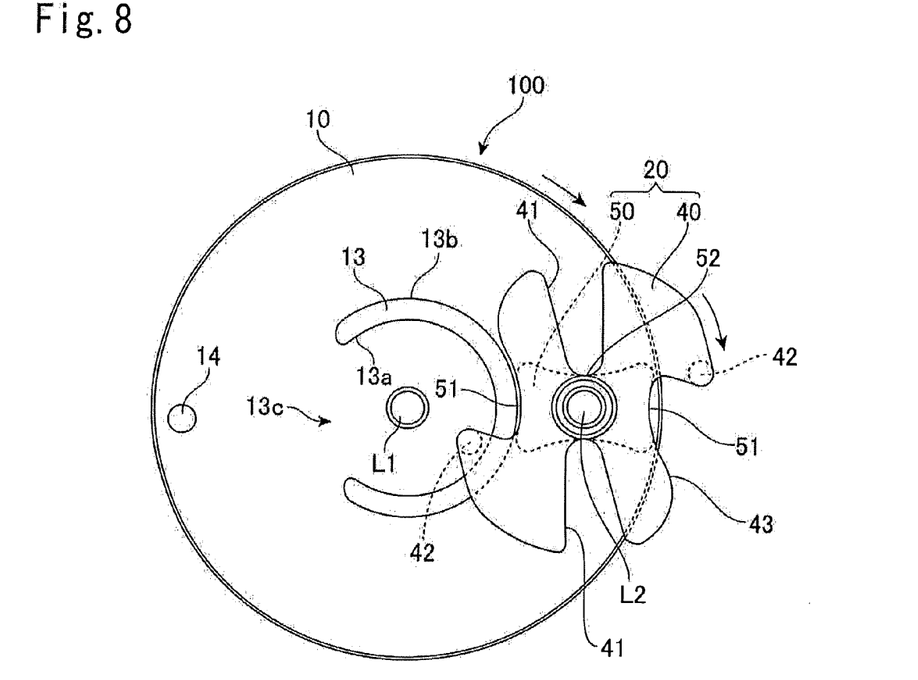
FIG. 8 is a plan view showing part of the driving mechanism in FIG. 2 in a state where the drive pin of the first rotor has moved out of the lead of the first member, a first surface of the second member of the second rotor is in contact with the outer surface of the guide of the first rotor, and a stopper pin of the first member of the second rotor is in contact with an inner surface of the guide of the first rotor.

As shown in FIG. 8, when the drive pin 14 of the first rotor 10 becomes separated from the lead grooves 41 of the first member 40 of the second rotor 20, the guide 13 becomes interposed between one of the guide surfaces 51 of the second member 50 and one of the stopper pins 42 of the first member 40. This results in the rotation of the second member 50 stopping. By repeating the operation described above, the second member 50 is intermittently rotated in steps of 180° by rotating the first member 40.

According to the actuator 2 that includes the driving mechanism 100, by rotating the first rotor 10 by one revolution (360°) using the motor 30, it is possible to intermittently rotate the second rotor 20 in steps of half-revolutions (180°). Also, by rotating the first rotor 10 by substantially one revolution, it is possible to precisely rotate the second rotor 20 by one half-revolution. This means that it is not necessary to precisely control the position of the first rotor 10 using the motor 30, and by merely carrying out control that stops the motor 30 when the second rotor 20 has rotated by a half-revolution, it is possible to precisely drive the actuator 2 up and down or precisely turn a valve or the like on and off (i.e., to open and close the valve) using the actuator 2. It is possible to easily detect that the second rotor 20 has rotated by one half-revolution by using an appropriate magnetic sensor to detect that the poles of the first permanent magnet 91 that is rotationally driven by the second rotor 20 have become inverted.

The valve 1 equipped with the actuator 2 rotates the operation transmitting structure intermittently in steps of 180° and so is capable of rotating the first permanent magnet 91 so that the north pole and the south pole become inverted. This means that magnetic attraction (a pulling force) and repulsion (a repelling force) will alternately act between the first permanent magnet 91 and the second permanent magnet 92, so that the second permanent magnet 92 can be driven in a first direction. Accordingly, it is possible to open and close the valve element 3 using a simple mechanism and control where the actuator 2 is driven using the DC motor 30 that rotates in one direction. This means that by using an inexpensive valve, it is possible to intermittently supply a fluid, such as water that is supplied from a domestic water supply or the like, to the outside.

By merely supplying a small amount of power for a short time, the valve 1 that includes the actuator 2 is capable of opening and closing the valve main body 3. Accordingly, it is possible to open and close the valve 1 using batteries, without having to use a commercial power supply. In addition, according to the valve 1 that includes the actuator 2, so long as the position of the first permanent magnet 91 (i.e., the positions of the south pole and the north pole) does not change, there is no change in the open or closed state of the valve element 3. In the driving mechanism 100, the position of the first permanent magnet 91 will typically not change in response to vibration or the like. This means that vibrations and the like will have no effect on the opening and closing of the valve element 3, which makes the valve 1 very reliable.

A conventional Geneva drive such as disclosed in Document 2, may intermittently rotates an operation transmitting structure without positional adjustments using complex and precise control and mechanism. However, the intermittent movement of the follower of such conventional Geneva drive would be through 90° or less, and it is not possible to intermittently rotate a driven object that controls such as a pilot valve (valve itself), in steps of 180°. On the other hand, with the actuator 2 described above, by continuously rotating the first rotor 10, it is possible to intermittently rotate the second rotor 20 in steps of 180°. Accordingly, it is possible to drive (i.e., open and close) a driven object that controls the pilot valve disclosed in Document 1 without using a rotation stopper key that should be necessary for the mechanism shown in Document 1 but not shown in figures of Document 1.

Although an example where the two lead grooves ("leads") 41 and two guide surfaces ("first surfaces") 51 are provided with 180° symmetry has been described above, the numbers of lead grooves 41 and first surfaces 51 used in the driving mechanism 100 are not limited to the above examples. Depending on the rotational angle of the driving mechanism 100, it is also possible to provide three or more lead grooves 41 and first surfaces 51. Also, although an example where the valve 1 is driven by the actuator 2 has been described, the actuator 2 is capable of driving other operating targets aside from a valve. In addition, although an actuator that uses a permanent magnet has been described above, it is also possible to drive an operation transmitting structure aside from the first permanent magnet 91, for example an arm or another mechanical structure, using the driving mechanism 100.

The invention claimed is:
1. A driving mechanism comprising:
a first rotor that rotates around a first shaft and includes a guide that extends in a circular arc around the first shaft and a drive pin that is located outside the guide relative to the first shaft; and
a second rotor that rotates around a second shaft that is arranged in parallel with the first shaft and, when the first rotor rotates, the guide passes inside the second shaft and the drive pin passes outside the second shaft, wherein the second rotor includes:
a first member that has a plurality of leads which extend from the second shaft in a radial direction, with the drive pin entering one of the plurality of leads when the first rotor rotates; and
a second member that is provided between the first rotor and the first member, moves together with the first member, and includes a plurality of first surfaces that have substantially the same curvature as an outer surface of the guide that has circular arc-shape, wherein as the first rotor rotates, one of the plurality of first surfaces comes into contact with and becomes separated from the outer surface of the guide, wherein:
the plurality of leads and the plurality of first surfaces are disposed so that each lead is symmetrical with other leads and each first surface is symmetrical with other first surfaces about the second shaft and the plurality of leads and the plurality of first surfaces alternate around the second shaft;
when the first rotor rotates and the drive pin enters one of the plurality of leads, contact is released between one of the plurality of first surfaces and the outer surface of the guide, and the second rotor rotates around the second shaft, and when the first rotor rotates and the drive pin moves out of the one of the plurality of leads, a next first surface out of the plurality of first surfaces comes into contact with the outer surface of the guide; and
wherein the first member further includes two leads disposed at a pitch of 180° and two stopper pins disposed at positions approximately 90° from the leads, respectively, the stopper pins rotating in the same direction of the guide between the plurality of first surfaces and the first shaft, contacting an inner surface of the guide that has the circular arc-shape, and being disposed so as to pass a part where the guide is not provided when the second rotor rotates.
2. An actuator comprising:
a driving mechanism according to claim 1;
a motor for rotating the first rotor; and
an operation transmitting structure that rotates with the second rotor and is capable of being directly or indirectly connected to an operating target.
3. A valve comprising:
an actuator according to claim 2; and
an operating target that is directly or indirectly connected to the operation transmitting structure and is driven by the actuator,
wherein the operating target includes a valve element.
4. An actuator according to claim 2,
further comprising a first permanent magnet and a second permanent magnet that face one another in a first direction,
wherein the operation transmitting structure includes the first permanent magnet, the first permanent magnet being rotated so as to invert a north pole and a south pole thereof and causing magnetic attraction and repulsion alternately between the first permanent magnet and the second permanent magnet to drive the second permanent magnet in the first direction.
5. A valve comprising:
an actuator according to claim 4; and
a valve element whose flow channel is opened and closed owing to the second permanent magnet.

* * * * *